(12) United States Patent
Shi et al.

(10) Patent No.: US 11,967,261 B2
(45) Date of Patent: Apr. 23, 2024

(54) METHOD AND DEVICE FOR ADJUSTING WHITE BALANCE OF SPLICED SCREEN, ELECTRONIC DEVICE AND STORAGE MEDIUM

(71) Applicant: BOE TECHNOLOGY GROUP CO., LTD., Beijing (CN)

(72) Inventors: Bingchuan Shi, Beijing (CN); Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 192 days.

(21) Appl. No.: 17/425,788

(22) PCT Filed: Oct. 27, 2020

(86) PCT No.: PCT/CN2020/123969
§ 371 (c)(1),
(2) Date: Jul. 26, 2021

(87) PCT Pub. No.: WO2022/087819
PCT Pub. Date: May 5, 2022

(65) Prior Publication Data
US 2022/0319376 A1 Oct. 6, 2022

(51) Int. Cl.
*G09G 3/20* (2006.01)
*G09G 5/10* (2006.01)

(52) U.S. Cl.
CPC .............. *G09G 3/2003* (2013.01); *G09G 5/10* (2013.01); *G09G 2320/0233* (2013.01); *G09G 2320/0666* (2013.01)

(58) Field of Classification Search
CPC ......... G09G 3/2003; G09G 2320/0233; G09G 2320/0666; G09G 5/10
See application file for complete search history.

(56) References Cited

U.S. PATENT DOCUMENTS

| 2015/0243227 A1* | 8/2015 | Park | G09G 3/3413 |
| | | | 345/84 |
| 2018/0225075 A1* | 8/2018 | Park | G09G 3/3233 |

(Continued)

FOREIGN PATENT DOCUMENTS

| CN | 101051117 A | 10/2007 |
| CN | 102053812 A | 5/2011 |

(Continued)

OTHER PUBLICATIONS

Moiré phenomenon.
PGA image processing 7_common algorithm_solution Bayer format.

*Primary Examiner* — Joseph R Haley
*Assistant Examiner* — Jennifer L Zubajlo
(74) *Attorney, Agent, or Firm* — HOUTTEMAN LAW LLC (57) ABSTRACT

There is provided a method for adjusting white balance of a spliced screen, which includes: acquiring an image to be analyzed; the image to be analyzed includes a picture, to be analyzed, displayed by a display screen to be adjusted, and the display screen to be adjusted is at least a portion of all display screens of the spliced screen; and determining a white balance adjustment mode of the display screen, to be adjusted, corresponding to the picture to be analyzed according to at least the picture to be analyzed in the image to be analyzed.

12 Claims, 4 Drawing Sheets

(56) References Cited

U.S. PATENT DOCUMENTS

| | | | |
|---|---|---|---|
| 2021/0295760 A1* | 9/2021 | Lee | G06F 3/1446 |
| 2022/0172693 A1* | 6/2022 | Tsai | G09G 5/02 |

FOREIGN PATENT DOCUMENTS

| | | | | |
|---|---|---|---|---|
| CN | 102801899 A | | 11/2012 | |
| CN | 105336286 A | | 2/2016 | |
| CN | 105336286 A | * | 2/2016 | |
| CN | 105405413 A | * | 3/2016 | G09G 3/3406 |
| CN | 105405413 A | | 3/2016 | |
| CN | 106162006 A | | 11/2016 | |
| CN | 106710571 A | | 5/2017 | |
| CN | 106710571 A | * | 5/2017 | G09G 5/10 |
| CN | 106817542 A | | 6/2017 | |
| CN | 108063935 A | | 5/2018 | |
| CN | 108234975 A | | 6/2018 | |
| CN | 108630142 A | | 10/2018 | |
| CN | 109637434 A | * | 4/2019 | G09G 3/32 |
| CN | 109637434 A | | 4/2019 | |
| CN | 110120207 A | | 8/2019 | |
| CN | 111402825 A | | 7/2020 | |
| CN | 111402827 A | | 7/2020 | |
| JP | 200732522 A | | 12/2007 | |
| JP | 2020014048 A | | 1/2020 | |
| JP | 2020057846 A | | 4/2020 | |

\* cited by examiner

METHOD AND DEVICE FOR ADJUSTING WHITE BALANCE OF SPLICED SCREEN, ELECTRONIC DEVICE AND STORAGE MEDIUM

TECHNICAL FIELD

The present disclosure relates to the field of display parameter adjustment technology, and in particular to a method and a device for adjusting white balance of a spliced screen, an electronic device and a computer readable medium.

BACKGROUND

The spliced screen is an integral display device formed by splicing and coordinately combining a plurality of display screens (display elements), can realize a plurality of display modes such as combined display, roaming display, split display and the like, has high degree of freedom, and is widely applied to various fields.

The white balance of the spliced screen is one of important indexes influencing display property of the spliced screen, so that a simple, efficient and accurate white balance adjustment mode of the spliced screen is expected by people.

SUMMARY

Embodiments of the present disclosure provide a method and a device for adjusting white balance of a spliced screen, an electronic device and a computer readable medium.

In a first aspect, an embodiment of the present disclosure provides a method for adjusting white balance of a spliced screen, where the spliced screen includes at least two display screens, and the method includes:

acquiring an image to be analyzed; the image to be analyzed includes a picture to be analyzed, which is displayed by a display screen to be adjusted, and the display screen to be adjusted is at least a portion of all display screens of the spliced screen;

determining a white balance adjustment mode of the display screen, to be adjusted, corresponding to the picture to be analyzed, according to at least the picture to be analyzed in the image to be analyzed.

In some implementations, before the acquiring the image to be analyzed, the method further includes: determining one of the display screens as a reference display screen; acquiring a reference image, where the reference image includes a reference picture displayed by the reference display screen; determining a reference parameter according to the reference picture in the reference image; the display screen to be adjusted is at least a portion of all the display screens of the spliced screen other than the reference display screen;

the determining the white balance adjustment mode of the display screen, to be adjusted, corresponding to the picture to be analyzed, according to at least the picture to be analyzed in the image to be analyzed includes:

determining the white balance adjustment mode of the display screen, to be adjusted, corresponding to the picture to be analyzed, according to the picture to be analyzed in the image to be analyzed and the reference parameter.

In some implementations, the determining one of the display screens as the reference display screen includes:

determining the display screen with a minimum brightness for displaying a white picture with a maximum gray scale, in all the display screens of the spliced screen, as the reference display screen.

In some implementations, three reference images are determined, and reference pictures in the three reference images include a picture with a maximum gray scale and a first color, a picture with a maximum gray scale and a second color, and a picture with a maximum gray scale and a third color, respectively; the first color, the second color and the third color constitute three primary colors and are three color channels of each of the display screens of the spliced screen.

In some implementations, the picture to be analyzed is a white picture with a maximum gray scale.

In some implementations, the determining the reference parameter according to the reference picture in the reference image includes:

determining reference parameters F11, F12, F13, F21, F22, F23, F31, F32 and F33 according to the reference picture in the reference image; where Fij represents a color component of a $j^{th}$ color in the picture with the maximum gray scale and an $i^{th}$ color;

the determining the white balance adjustment mode of the display screen, to be adjusted, corresponding to the picture to be analyzed, according to the picture to be analyzed in the image to be analyzed and the reference parameter includes:

determining parameters f1, f2 and f3 of any picture to be analyzed in the image to be analyzed; where fi represents a color component of the $i^{th}$ color of the picture to be analyzed;

determining adjustment coefficients X1, X2, X3 of the picture to be analyzed, according to following formula (1), Xi represents a gain coefficient of an $i^{th}$ color channel:

$$\begin{bmatrix} f1 \\ f2 \\ f3 \end{bmatrix} = \begin{bmatrix} F11 & F21 & F31 \\ F12 & F22 & F32 \\ F13 & F23 & F33 \end{bmatrix} \begin{bmatrix} X1 \\ X2 \\ X3 \end{bmatrix}; \quad (1)$$

determining the white balance adjustment mode of the display screen, to be adjusted, corresponding to the picture to be analyzed, according to the adjustment coefficients X1, X2 and X3; the white balance adjustment mode includes: in response to that Xi is less than a first preset value, increasing a gain of the $i^{th}$ color channel of the display screen, to be adjusted, corresponding to the picture to be analyzed; in response to that Xi is greater than a second preset value, reducing the gain of the $i^{th}$ color channel of the display screen, to be adjusted, corresponding to the picture to be analyzed; and in response to that Xi is greater than or equal to the first preset value and less than or equal to the second preset value, keeping the gain of the $i^{th}$ color channel of the display screen, to be adjusted, corresponding to the picture to be analyzed, unchanged.

In some implementations, after determining the white balance adjustment mode of the display screen, to be adjusted, corresponding to the picture to be analyzed, according to at least the picture to be analyzed in the image to be analyzed, the method further includes:

in response to that the white balance adjustment mode includes changing the gain of at least one color channel of at least one display screen to be adjusted, after the gain of the corresponding color channel of the corresponding display screen to be adjusted is correspondingly changed, returning to the acquiring the image to be analyzed; and in response to that the white balance adjustment mode does not include changing the gain of any color channel of any display screen to be adjusted, ending white balance adjustment for the spliced screen.

In some implementations, the determining the white balance adjustment mode of the display screen, to be adjusted, corresponding to the picture to be analyzed includes:

segmenting the picture to be analyzed from the image to be analyzed.

In some implementations, the picture to be analyzed is a white picture with a maximum gray scale.

In some implementations, the acquiring the image to be analyzed includes:

in response to that at least a portion of the display screens to be adjusted display the picture to be analyzed, acquiring the image to be analyzed including the picture to be analyzed through an image acquisition element.

In some implementations, in response to that at least a portion of the display screens to be adjusted display the picture to be analyzed, the acquiring the image to be analyzed including the picture to be analyzed through the image acquisition element includes:

acquiring the image to be analyzed in response to that the picture to be analyzed is displayed on the at least a portion of the display screens to be adjusted and in a preset central area of an acquisition range of the image acquisition element; the acquisition range further includes a peripheral area surrounding the central area.

In some implementations, in response to that at least a portion of the display screen to be adjusted display the picture to be analyzed, the acquiring the image to be analyzed including the picture to be analyzed through the image acquisition element includes:

in response to that all the display screens to be adjusted simultaneously display pictures to be analyzed, acquiring the image to be analyzed including all the pictures to be analyzed at one time through the image acquisition element.

In some implementations, before the acquiring the image to be analyzed, the method further includes:

controlling a picture displayed by the display screen.

In some implementations, after determining the white balance adjustment mode of the display screen, to be adjusted, corresponding to the picture to be analyzed, according to at least the picture to be analyzed in the image to be analyzed, the method further includes:

according to the white balance adjustment mode, performing white balance adjustment on the display screen, to be adjusted, corresponding to the white balance adjustment mode.

In a second aspect, an embodiment of the present disclosure provides a device for adjusting white balance of a spliced screen, including:

an acquisition element configured to acquire an image to be analyzed; the image to be analyzed includes a picture to be analyzed, which is displayed by a display screen to be adjusted, and the display screen to be adjusted is at least a portion of all display screens of the spliced screen;

an analysis element configured to determine a white balance adjustment mode of the display screen, to be adjusted, corresponding to the picture to be analyzed, according to at least the picture to be analyzed in the image to be analyzed.

In some implementations, the acquisition element includes an image acquisition element configured to acquire the image to be analyzed.

In some implementations, the device for adjusting white balance of the spliced screen further includes at least one of:

a control element configured to control a picture displayed by the display screen; and an adjusting element configured to perform white balance adjustment on the display screen, to be adjusted, corresponding to the white balance adjustment mode according to the white balance adjustment mode.

In a third aspect, an embodiment of the present disclosure provides an electronic device, including:

one or more processors;

a memory having one or more computer programs stored thereon; and one or more I/O interfaces coupled between the processors and the memory and configured to realize information interaction between the processors and the memory;

the one or more computer programs implement, when being executed by the one or more processors, the method for adjusting white balance of the spliced screen described above.

In a fourth aspect, an embodiment of the present disclosure provides a computer readable medium, on which a computer program is stored, where the computer program is executed by a processor to implement the method for adjusting white balance of the spliced screen described above.

DESCRIPTION OF DRAWINGS

The accompanying drawings are included to provide a further understanding of the embodiments of the present disclosure, and are incorporated in and constitute a part of this specification, illustrate embodiments of the present disclosure and together with the description serve to explain the principles of the present disclosure and not to limit the present disclosure. The above and other features and advantages will become more apparent to those skilled in the art by describing in detail exemplary embodiments with reference to the attached drawings, in which.

DESCRIPTION OF EMBODIMENTS

In order to make those skilled in the art better understand the technical solutions of the embodiments of the present disclosure, the method and device for adjusting white balance of a spliced screen, the electronic device, and the computer readable medium provided in the embodiments of the present disclosure are described in detail below with reference to the accompanying drawings.

The embodiments of the present disclosure will be described more fully hereinafter with reference to the accompanying drawings, but the embodiments shown may be embodied in different forms and should not be construed as limiting to the embodiments of the present disclosure. Rather, these embodiments shown are provided so that the present disclosure will be more thorough and complete, and will fully convey the scope of the present disclosure to those skilled in the art.

Embodiments of the present disclosure may be described with reference to plan and/or cross-sectional views by way of idealized schematic illustrations of the present disclosure. Accordingly, the example illustrations may be modified in accordance with manufacturing techniques and/or tolerances.

Embodiments of the present disclosure and features of the embodiments may be combined with each other without conflict.

The terminology used in the present disclosure is for the purpose of describing particular embodiments only and is not intended to be limiting of the present disclosure. As used in the present disclosure, the term "and/or" includes any and all combinations of one or more of the associated listed items. As used in the present disclosure, the singular forms "a", "an" and "the" are intended to include the plural forms as well, unless the context clearly indicates otherwise. The terms "include", "comprise", "made of . . . " as used in the present disclosure, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used in the present disclosure have the same meaning as commonly understood by one of ordinary skill in the art. It will be further understood that terms, those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments of the present disclosure are not limited to the embodiments shown in the drawings, but include modifications of configurations formed based on a manufacturing process. Thus, areas illustrated in the figures have schematic properties, and shapes of the areas shown in the figures illustrate specific shapes of the areas of elements, but are not intended to be limiting.

The "white balance" is a specific state of "white" displayed by the display device, such as purity, brightness, etc. of the white, and can be specifically determined by a gain of each primary color (e.g. red, green, blue) channel of the display device, that is, a ratio (e.g. a ratio of chromaticity) of each primary color during displaying the white, so that a difference of the white balance affects an actual display effect of the display device.

For a spliced screen, each display screen of the spliced screen is relatively independent, so that display screens of the spliced screen respectively have respective white balance states; meanwhile, all the display screens of the spliced screen usually display together, and thus if the white balance states of all the display screens are different, the display effect is seriously influenced by obviously showing differences between the white balance states through contrast between the display screens.

In some related technologies, white balances of the display screens of the spliced screen, that is, the white balance of the spliced screen, may be adjusted by an operator one by one through visual observation and manual adjustment according to feeling. However, the number of display screens in the spliced screen is relatively large, and thus the above mode is time-consuming and labor-consuming; moreover, due to differences of subjective consciousness, technical level and the like of operators, the above mode is difficult to ensure the adjustment effect, and especially difficult to ensure the uniformity of the white balance states of the display screens of the spliced screen.

In a first aspect, an embodiment of the present disclosure provides a method for adjusting white balance of a spliced screen, where the spliced screen includes at least two display screens.

The embodiment of the present disclosure is used for white balance adjustment of the spliced screen, and particularly, for adjusting the white balance of each display screen of the spliced screen, so that the white balance states of the display screens are unified as much as possible, and the spliced screen can obtain a better display effect integrally.

The spliced screen is an integral display device formed by splicing and coordinately combining a plurality of display screens. Each display screen in the spliced screen is also called a "display unit", which is a "display device" capable of displaying a desired picture independently, that is, different display screens are independent from each other, and their display parameters, display effects, and the like do not affect each other.

Figure 1:
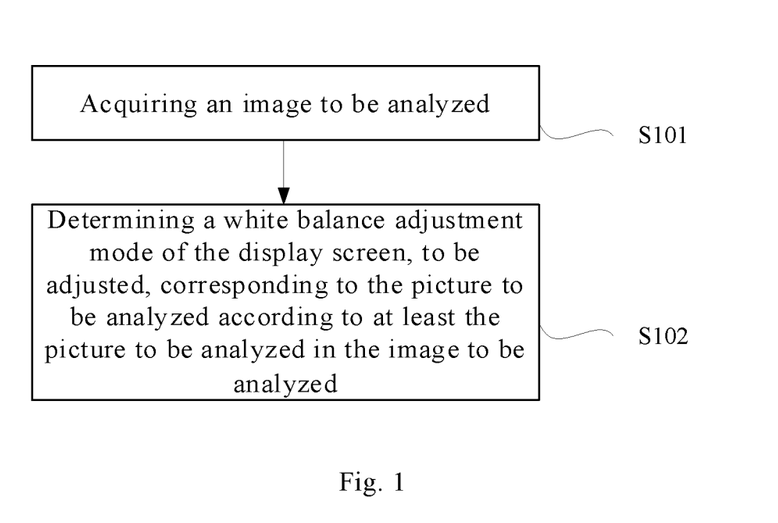
FIG. 1 is a flowchart of a method for adjusting white balance of a spliced screen according to an embodiment of the present disclosure.

Referring to FIG. 1, the method for adjusting white balance of the spliced screen according to the embodiment of the present disclosure includes following steps S101 and S102.

At step S101, an image to be analyzed is acquired.

The image to be analyzed includes a picture to be analyzed displayed by the display screen to be adjusted, and the display screen to be adjusted is at least a portion of all the display screens of the spliced screen.

During each white balance adjustment, at least a portion of all the display screens of the spliced screen (such as the display screen to be used after a short time later) is to be adjusted and are called display screens to be adjusted.

Certainly, in each white balance adjustment process, a portion of the display screens (for example, the display screens which are not to be used after a short time later) may not be adjusted and thus they do not belong to the display screens to be adjusted.

The picture to be analyzed that is to be displayed by each display screen to be adjusted is collected into a specific image (image to be analyzed), so that the image to be analyzed shows an actual display state of each display screen to be adjusted, which certainly includes a white balance state.

The term "acquiring an image to be analyzed" means that the device for adjusting the white balance of the spliced screen acquires data of the image to be analyzed in any manner, for example, the device acquires the image to be analyzed directly, or acquires the data of the image to be analyzed through a data interface.

At step S102, a white balance adjustment mode of the display screen, to be adjusted, corresponding to the picture to be analyzed is determined according to at least the picture to be analyzed in the image to be analyzed.

By analyzing the picture to be analyzed in the image to be analyzed, the current white balance state of each display screen to be adjusted can be determined, so that how to adjust the white balance of each display screen to be adjusted can be further determined, that is, the white balance adjustment mode of each display screen to be adjusted (for example, the gain of each color channel of the display screen needs to be increased or decreased) is determined.

After the white balance adjustment mode is obtained, the corresponding display screen may be actually adjusted manually according to the white balance adjustment mode;

or, a device for adjusting white balance of the spliced screen may directly control the corresponding display screen to be adjusted; alternatively, the above white balance adjustment mode may be used only as a parameter for evaluating the state of the display screen, and is not used for actual adjustment.

The white balance adjustment mode may include actual adjustment for the display screen to be adjusted, or may not require adjustment for the display screen to be adjusted, that is, the white balance adjustment mode may include "no adjustment".

In the embodiment of the present disclosure, an image to be analyzed is obtained, and the image to be analyzed has a picture, to be analyzed, actually displayed by each display screen of a spliced screen, and the picture to be analyzed actually shows white balance state information of the corresponding display screen (for example, represented by chromaticity); further, by processing each picture to be analyzed, it is possible to determine how the white balance of the corresponding display screen should be adjusted (the white balance adjustment mode is determined).

It can be seen that, the image to be analyzed may be acquired through a conventional image acquisition element (such as a camera of a mobile phone), so that the white balance state information of the display screen is accurately acquired by using a simple image acquisition element, in other words, the image acquisition element plays a role of a colorimeter, so that the cost and the implementation difficulty are low, and the acquired information is accurate; meanwhile, in the embodiment of the present disclosure, the white balance adjustment mode is obtained through the objective image to be analyzed and a determined processing method, and thus, compared with the modes of visual observation, adjustment according to feeling and the like, the influence of human coefficients can be avoided and accurate and objective results can be obtained.

Figure 2:
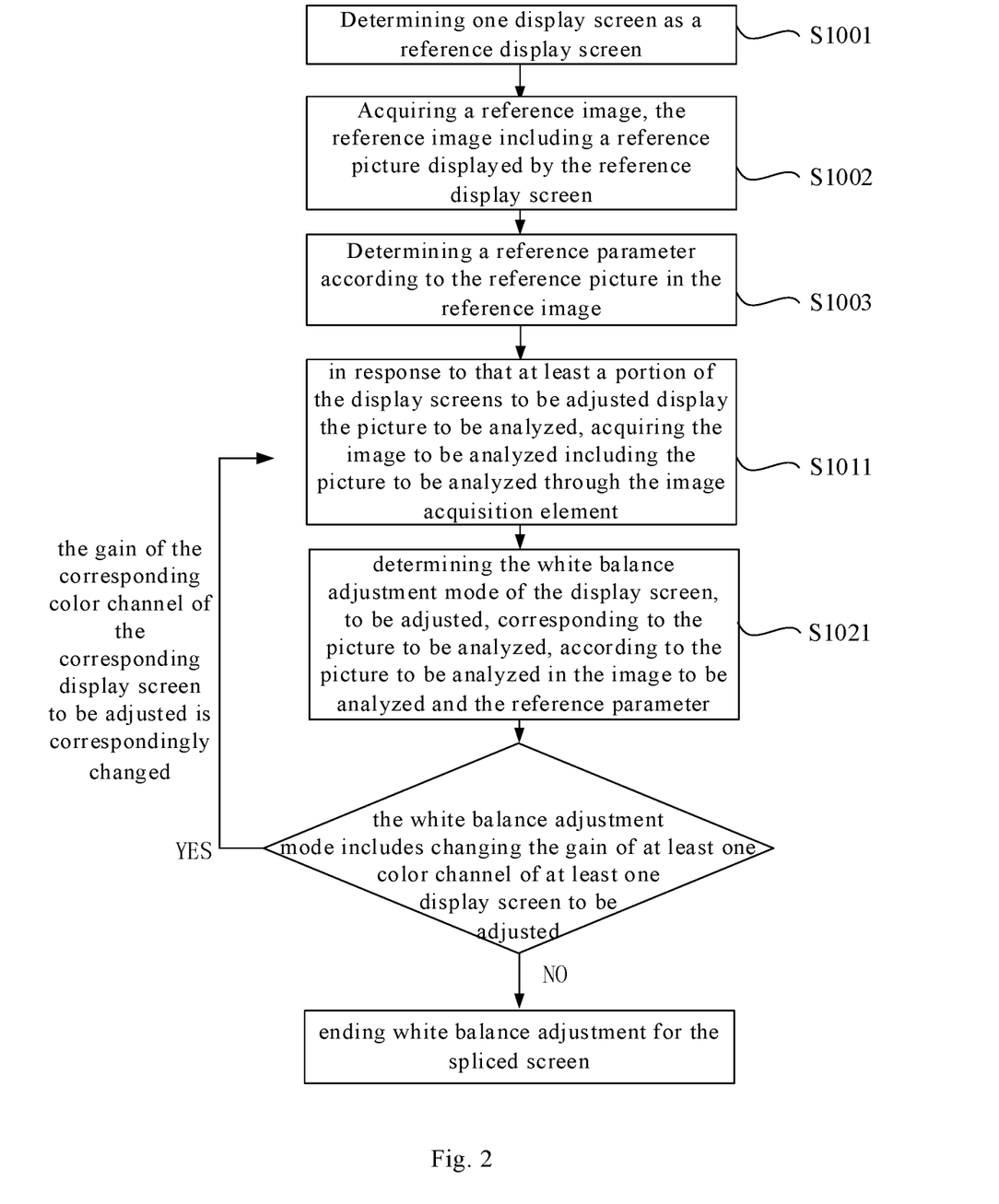
FIG. 2 is a flowchart of a method for adjusting white balance of a spliced screen according to an embodiment of the present disclosure.

In some implementations, with reference to FIG. 2, the acquiring the image to be analyzed (step S101) includes:

step S1011, in response to that at least a portion of the display screens to be adjusted display the picture to be analyzed, acquiring the image to be analyzed including the picture to be analyzed through the image acquisition element.

As a mode of the embodiment of the present disclosure, the picture to be analyzed may be actually displayed on the display screen to be adjusted, and the image including the picture displayed by the display screen to be adjusted is acquired (for example, photographed) by the image acquisition element, that is, the image, to be analyzed, including the picture to be analyzed is actually acquired.

The image acquisition element may be any device with an image acquisition function, such as a camera of a mobile phone, a digital camera, a video camera and the like.

Certainly, the device for adjusting the white balance of the spliced screen may also "acquire" the image to be analyzed in other manners, for example, receive data of the image to be analyzed (e.g., the image, to be analyzed, that is collected by others in advance) from other sources through a data interface (e.g., a network interface, a USB interface, etc.).

In some implementations, in response to that at least a portion of the display screens to be adjusted display the picture to be analyzed, the acquiring the image to be analyzed including the picture to be analyzed through the image acquisition element (step S1011) includes:

step S10111, acquiring the image to be analyzed in response to that the picture to be analyzed is displayed on at least a portion of the display screens to be adjusted and in a preset central area of an acquisition range of the image acquisition element.

The acquisition range further includes a peripheral area surrounding the central area.

Based on the limitation of imaging principle, no matter what the image acquisition element is, the imaging quality is generally worse (e.g. low signal-to-noise ratio, large distortion, etc.) at an edge of the acquisition range (field of view range).

However, white balance adjustment requires information of the picture to be analyzed as accurately as possible. Therefore, as a mode of the embodiment of the present disclosure, an area with better imaging quality in the acquisition range (duration range) of the image acquisition element may be predefined as a central area, and for acquiring the image to be analyzed, all the pictures to be analyzed are placed in the central area, for example, the whole spliced screen is placed in the central area.

It should be understood that other acquisition parameters of the image acquisition element (such as acquisition angle, exposure time, etc.) may be set as desired.

In addition, the parameters (such as background signals) of the image acquisition element may be set according to requirements.

The specific setting modes of the central area, the acquisition parameters, the parameters of the image acquisition element, and the like are described in detail later.

In some implementations, in response to that at least a portion of the display screen to be adjusted displays the picture to be analyzed, the acquiring the image to be analyzed including the picture to be analyzed through the image acquisition element (step S1011) includes:

step S10112, in response to that all the display screens to be adjusted simultaneously display pictures to be analyzed, acquiring an image including all the pictures to be analyzed at one time through the image acquisition element.

As a mode of the embodiment of the present disclosure, all the display screens to be adjusted may simultaneously display the pictures to be analyzed, and the image acquisition element simultaneously acquires the image including all the pictures to be analyzed, for example, acquires the image to be analyzed including the entire spliced screen. Therefore, acquisition environments of all the pictures to be analyzed in the image to be analyzed are the same, so that the image to be analyzed can best represent actual states of the display screens.

It should be understood that it is also feasible if each acquired image to be analyzed only includes the picture to be analyzed displayed on a portion of the display screens to be adjusted.

For example, a plurality of images to be analyzed may be acquired respectively, each image to be analyzed only includes a portion of the pictures to be analyzed, so that each image to be analyzed may be processed respectively so as to adjust the display screen to be adjusted corresponding to the picture to be analyzed in the image to be analyzed; or, the pictures to be analyzed acquired for multiple times may be spliced into one image to be analyzed, and then the image to be analyzed is processed.

In some implementations, referring to FIG. 2, before acquiring the image to be analyzed (step S101), the method further includes following steps S1001 to S1003.

At step S1001, one display screen is determined as a reference display screen.

The display screen to be adjusted is at least a portion of all the display screens of the spliced screen other than the reference display screen.

At step S1002, a reference image is acquired, where the reference image includes a reference picture displayed by the reference display screen.

At step S1003, a reference parameter is determined according to the reference picture in the reference image.

The determining the white balance adjustment mode of the display screen, to be adjusted, corresponding to the picture to be analyzed, according to at least the picture to be analyzed in the image to be analyzed (step S102) includes:

step S1021, determining the white balance adjustment mode of the display screen, to be adjusted, corresponding to the picture to be analyzed, according to the picture to be analyzed in the image to be analyzed and the reference parameter.

As a mode of the embodiment of the present disclosure, one display screen of the spliced screen may be taken as a "standard (reference display screen)" first, and a picture (reference picture) displayed by the reference display screen is obtained, so as to determine a state (reference parameter, which may represent a white balance state of the reference display screen) of the reference display screen according to the reference picture; therefore, the corresponding white balance adjustment mode can be determined subsequently according to each picture to be analyzed and the reference parameter, and other display screens to be adjusted can be adjusted towards the reference display screen.

One key of white balance adjustment of the spliced screen is to enable the white balance states of the display screens to be the same or close to each other; therefore, if one of the display screens is taken as a reference, the display screen as the reference does not need to be adjusted, which facilitates to simplify the white balance adjustment process of the spliced screen.

Certainly, it is also feasible if the "reference" for the adjustment is determined in other ways.

For example, a "preset parameter" or an "average parameter" of the display screens may be taken as the reference.

Alternatively, instead of setting the "reference", the respective display screens may determine the respective white balance adjustment modes according to the respective states and the state relationship therebetween.

In some implementations, the determining one display screen as the reference display screen (step S1001) includes:

step S10011, determining the display screen, with a minimum brightness for displaying a white picture with a maximum gray scale, in all the display screens of the spliced screen, as the reference display screen.

As a mode of the embodiment of the present disclosure, among all the display screens, the display screen with the smallest "maximum achievable brightness value (brightness for display a white picture with a maximum gray scale)" may be determined as the reference display screen, that is, the "darkest" display screen is determined as the reference display screen.

The gray scale is a parameter representing a display brightness level, and a greater value thereof represents a higher corresponding display brightness level, that is, a greater display brightness. For example, the gray scale of the display screen may be divided into 256 levels, the maximum gray scale is the level of 255 level, and so on.

The reason why the darkest display screen is selected as the reference display screen is that the display screen generally can be adjusted to be darker, but if the display screen is adjusted to be brighter, the adjustment cannot be realized when the display capability of the display screen is exceeded; and when the display screen with the smallest "maximum brightness value" is selected as the reference display screen, other display screens can be ensured to be brighter than the reference display screen initially, and the other display screens can be adjusted to be 'darker', which is easy to be realized.

Certainly, there are various specific manners for determining the above "display screen with the minimum brightness for displaying the white picture with the maximum gray scale". For example, the determination may be made manually when all the display screens actually display the white picture with the maximum gray scale, or a brightness measurement may be performed, or an image including the corresponding white picture may be collected and analyzed.

In some implementations, three reference images may be determined, and reference pictures in the three reference images include a picture with a maximum gray scale and a first color, a picture with a maximum gray scale and a second color, and a picture with a maximum gray scale and a third color, respectively; the first color, the second color and the third color constitute three primary colors and are three color channels of each display screen of the spliced screen.

As a mode of the embodiment of the present disclosure, pure color pictures of the three primary colors corresponding to the display screen may be selected as reference pictures respectively to obtain the above reference parameters.

The three primary colors corresponding to the display screen refer to that the display screen includes three types of sub-pixels for the three primary colors, where each color corresponds to a color channel of the display screen, and the gain of each color channel of the display screen is a parameter which can be adjusted independently.

Exemplarily, the first color, the second color and the third color may be selected from red (R), green (G) and blue (B) without repetition.

Certainly, the first color, the second color, and the third color may also be three primary colors of other systems, which may be specifically set according to color channels (i.e., colors of sub-pixels) of the display screen.

The reference parameters are the standard and basis for adjusting the display screen to be adjusted, and therefore should be as accurate as possible, so that the reference display screen should display a pure color picture of each primary color, and the actual color state (reference parameters) of the reference display screen is determined according to the pure color picture.

In some implementations, the picture to be analyzed is a white picture with a maximum gray scale.

As a mode of the embodiment of the present disclosure, the picture, to be analyzed, displayed by each display screen to be analyzed may be a white color picture with a maximum gray scale, that is, a white color picture obtained when the gray scale of each color channel is the maximum value.

Since the actual adjustment of the embodiment of the present disclosure is for the state of the "white color picture (i.e., white balance)" displayed by each display screen to be adjusted, it should be performed based on the "white color picture" of the display screen to be adjusted.

In some implementations, the determining the reference parameter according to the reference picture in the reference image (step S1003) includes:

Step S10031, determining reference parameters F11, F12, F13, F21, F22, F23, F31, F32, F33 according to the reference picture in the reference image, where Fij represents a color component of a $j^{th}$ color in the picture with a maximum gray scale and an $i^{th}$ color.

Based on a process and a technique for displaying, when the display screen (reference display screen) displays a picture of a certain color, light emitted from the display screen generally includes not only a component of the color but also other color components. Therefore, three color components (e.g. chroma) of three primary colors can be respectively derived from a reference picture of one color, e.g. for a picture with the first color and the maximum gray scale, a component of the second color is included, i.e., F12 can be derived from the picture of the first color; thereby, F11, F12, F13 may be obtained according to the picture with the maximum gray scale and the first color;

F21, F22, F23 may be obtained according to the picture with the maximum gray scale and the second color; and F31, F32, F33 may be obtained according to the picture with the maximum gray scale and the third color.

Thus, from reference images of all three primary colors, the above reference parameters F11, F12, F13, F21, F22, F23, F31, F32, F33 can be determined.

The determining the white balance adjustment mode of the display screen, to be adjusted, corresponding to the picture to be analyzed, according to the picture to be analyzed in the image to be analyzed and the reference parameter (S1021) includes following steps S10211 to S10213.

At step S10211, parameters f1, f2 and f3 of any picture to be analyzed in the image to be analyzed are determined, where fi represents a color component of the $i^{th}$ color of the picture to be analyzed.

The picture (white picture) to be analyzed obviously includes components of the first color, the second color and the third color, and thus f1, f2 and f3 can be obtained according to the picture to be analyzed.

At step S10212, adjustment coefficients X1, X2 and X3 of the picture to be analyzed is determined according to following formula (1), where Xi represents the gain coefficient of the $i^{th}$ color channel.

$$\begin{bmatrix} f1 \\ f2 \\ f3 \end{bmatrix} = \begin{bmatrix} F11 & F21 & F31 \\ F12 & F22 & F32 \\ F13 & F23 & F33 \end{bmatrix} \begin{bmatrix} X1 \\ X2 \\ X3 \end{bmatrix}. \quad (1)$$

After the reference parameters F11, F12, F13, F21, F22, F23, F31, F32, F33 representing the white balance state of the reference display screen and the parameters f1, f2, f3 representing the current white balance state of the display screen to be adjusted are determined, the adjustment coefficients X1, X2, X3 can be determined according to the above formula.

Each adjustment coefficient represents a difference between the corresponding color component of the current display screen to be adjusted and the color component of the reference display screen; for example, X1 represents the difference between the current component of the first color of the display screen to be adjusted and the component of the first color of the reference display screen.

At step S10213, the white balance adjustment mode of the display screen, to be adjusted, corresponding to the picture to be analyzed, is determined according to the adjustment coefficients X1, X2 and X3.

The white balance adjustment mode includes: when Xi is less than a first preset value, increasing the gain of the $i^{th}$ color channel of the display screen, to be adjusted, corresponding to the picture to be analyzed; when Xi is greater than a second preset value, reducing the gain of the $i^{th}$ color channel of the display screen, to be adjusted, corresponding to the picture to be analyzed; and when the Xi is greater than or equal to the first preset value and less than or equal to the second preset value, keeping the gain of the $i^{th}$ color channel of the display screen, to be adjusted, corresponding to the picture to be analyzed, unchanged.

According to the above X1, X2, and X3, it can be determined what adjustment should be performed on the corresponding color channel of the display screen to be adjusted to achieve the effect of the corresponding color channel of the reference display screen, that is, to make the white balance state of the display screen to be adjusted be the same as or close to the white balance state of the reference display screen.

For example, when Xi (e.g., X1) is less than the first preset value (e.g., 0.99), it indicates that the current component of the $i^{th}$ color (e.g., first color) of the display screen to be adjusted is less than the component of the $i^{th}$ color (e.g., first color) of the reference display screen, and thus the gain of the $i^{th}$ color (e.g., first color) channel of the display screen to be adjusted should be increased.

For another example, when Xi (e.g., X1) is greater than the second preset value (e.g., 1.01), it indicates that the current component of the $i^{th}$ color (e.g., first color) of the display screen to be adjusted is greater than the component of the $i^{th}$ color (e.g., first color) of the reference display screen, and thus the gain of the $i^{th}$ color (e.g., first color) channel of the display screen to be adjusted should be reduced.

For another example, when Xi (e.g., X1) is greater than or equal to the first preset value (e.g., 0.99) and less than or equal to the second preset value (e.g., 1.01), it indicates that the current component of the $i^{th}$ color (e.g., first color) of the display screen to be adjusted is already close to the component of the $i^{th}$ color (e.g., first color) of the reference display screen, and thus the corresponding white balance adjustment mode should be "no adjustment" for the gain of the $i^{th}$ color (e.g., first color) channel.

The first preset value and the second preset value may be set according to a previous calculation or experience, and specific values thereof are not limited to the above 0.99 and 1.01; for example, the above first preset value may also be 0.98, 0.985, 0.995, etc., and the above second preset value may also be 1.005, 1.015, 1.02, etc.

The specific values of the above increase and decrease of the gains of the color channels may be determined according to various different modes.

For example, it may be that whenever it is determined from Xi that the gain of the $i^{th}$ color channel should be increased/decreased, the gain of the $i^{th}$ color channel is increased/decreased by a fixed value accordingly.

Alternatively, it is also possible to establish a correspondence between a specific value of Xi and an increase/decrease value of the gain of the $i^{th}$ color channel, that is, the adjustment value of the gain of the $i^{th}$ color channel is determined according to the specific value of Xi.

It should be understood that the specific manner of adjusting the gains of the color channels is also varied.

For example, the correspondence between display data (such as a value of a certain color component of a pixel point in data input to the display screen) and a gray scale value for driving a sub-pixel of a corresponding color to display may be adjusted.

Alternatively, when the gray scale value is changed, the specific value of the driving signal of the sub-pixel of the corresponding color may be input.

For example, for a Liquid Crystal Display (LCD) screen, the driving signal is a "data voltage (Vdata)", and thus changing the gain of a certain color channel is to change a value of the data voltage that the sub-pixel of the color should obtain at the same gray scale value. The specific manner of changing the above value of the data voltage may also be various: for example, the gamma voltage input to the data Driver IC (Source Driver IC) may be adjusted; or, the gamma curve relation or gamma value of the display screen may be changed; alternatively, a correspondence table between values of the data voltage output from the data Driver IC and the gray scale values may be changed.

For another example, for an Organic Light Emitting Diode (OLED) display screen, a Micro-LED display screen, a nano-LED display screen, etc., the driving signal is a "driving current (Id)", and thus changing the gain of a color channel is to change a value of the driving current that the sub-pixel of the corresponding color should obtain under the same gray scale value (if the gain is increased, the value of the driving current is increased, and if the gain is decreased, the value of the driving current is decreased).

For example, for an electronic ink display screen, a plasma display screen, etc., specific parameter values to be changed may also be set according to their specific forms.

In some implementations, referring to FIG. 2, after determining the white balance adjustment mode of the display screen, to be adjusted, corresponding to the picture to be analyzed, according to at least the picture to be analyzed in the image to be analyzed (step S102), the method further includes:

in response to that the white balance adjustment mode includes changing the gain of at least one color channel of at least one display screen to be adjusted, returning to the acquiring the image to be analyzed after the gain of the corresponding color channel of the corresponding display screen to be adjusted is correspondingly changed.

In response to that the white balance adjustment mode does not include changing the gain of any color channel of any display screen to be adjusted, the white balance adjustment of the spliced screen is ended.

For the white balance adjustment mode obtained above, if it is not necessary to adjust the gain of any color channel of any display screen to be adjusted, it indicates that the current white balance of the spliced screen actually meets the requirements, and adjustment is no longer necessary, and thus the white balance adjustment of the spliced screen can be finished.

Correspondingly, if the white balance adjustment mode obtained still includes adjustment for the gain of a certain color channel of a certain display screen to be adjusted, it indicates that the current white balance of the spliced screen still needs to be adjusted; however, it is still unknown whether the white balance of the spliced screen can meet the requirements after the above white balance adjustment.

Therefore, when the white balance adjustment mode includes adjusting the gain of a color channel of a display screen to be adjusted, the acquiring the image to be analyzed (step S101) may be returned after the adjustment is actually completed, so as to acquire a new picture to be analyzed displayed on the adjusted display screen, and determine whether and how to perform adjustment according to the new picture to be analyzed again, until the obtained white balance adjustment mode includes "no adjustment".

Therefore, the white balance of the spliced screen can be adjusted for multiple times in an iterative adjustment mode, so that the final adjustment of the spliced screen is more accurate, and the display effect is better.

It should be understood that the above "after the gain of the corresponding color channel of the corresponding display screen to be adjusted being correspondingly changed" refers to a "state" in which the gain of the color channel of the display screen to be adjusted has been adjusted, which may be specifically implemented by directly controlling the corresponding display screen to be adjusted by the device for adjusting white balance of the spliced screen, or may be implemented by manually adjusting the corresponding display screen.

Certainly, it should be understood that it is also feasible that as long as the white balance adjustment mode is determined and a corresponding adjustment is performed accordingly, it is considered that the adjustment can certainly achieve the expected effect, and thus the process of adjusting the white balance of the spliced screen is ended.

In some implementations, the determining the white balance adjustment mode of the display screen, to be adjusted, corresponding to the picture to be analyzed according to at least the picture to be analyzed in the image to be analyzed includes: segmenting the picture to be analyzed from the image to be analyzed.

Obviously, each display screen has a "frame", and there is usually a certain gap between different display screens of the spliced screen, and thus the image to be analyzed that is usually acquired does not "only include" the picture to be analyzed of the display screen, but also includes frames, gaps, and the like. In such case, the real "picture to be analyzed" can be separated by image processing for subsequent processing.

Specific image processing modes for realizing the segmentation are various, and for example, the image processing modes may include determining a position corresponding to the picture to be analyzed through binarization processing, erosion processing and the like.

In some implementations, the picture to be analyzed is a white picture with a maximum gray scale.

As mentioned above, in order to best reflect the white balance state of the display screen to be adjusted, the above picture to be analyzed may be a white picture with a maximum gray scale, that is, a white picture obtained when the gray scale of each color channel is the maximum value.

In some implementations, before acquiring the image to be analyzed (step S101), the method further includes:

step S1004, controlling a picture displayed by the display screen.

As a mode of the embodiment of the present disclosure, for acquiring the image to be analyzed, the device for adjusting white balance of the spliced screen may directly send a control instruction to each display screen in advance to control each display screen to display a corresponding picture, for example, control each display screen to be adjusted to display the picture to be analyzed, or control the reference display screen to display the reference picture, etc.; therefore, the manual intervention can be further reduced, and the efficiency and the accuracy of the process for adjusting white balance of the spliced screen can be improved.

Certainly, it is also feasible if the picture displayed by each display screen to be adjusted is adjusted manually.

In some implementations, after determining the white balance adjustment mode of the display screen, to be adjusted, corresponding to the picture to be analyzed according to at least the picture to be analyzed in the image to be analyzed (step S102), the method further includes:

step S103, performing white balance adjustment on the display screen, to be adjusted, corresponding to the white balance adjustment mode according to the white balance adjustment mode.

As a mode of the embodiment of the present disclosure, after acquiring the white balance adjustment mode, the device for adjusting the white balance of the spliced screen may directly send a control instruction to each display screen to control each display screen to be adjusted according to the corresponding white balance adjustment mode (for example, increase or decrease the gain of each color channel of the display screen); therefore, the manual intervention can be further reduced, and the efficiency and the accuracy of the process for adjusting white balance of the spliced screen can be improved.

As a mode of the embodiment of the present disclosure, the method for adjusting white balance of the spliced screen is described by taking the display screen including a red (R, first color) channel, a green (G, second color) channel, and a blue (B, third color) channel as an example, where a required image (such as the image to be analyzed and the reference image) is actually acquired by the image acquisition element.

The image acquisition element may be in the form of a camera of a mobile phone or the like, supports RAW image output, and is capable of adjusting the focal length and the exposure time (Te).

The RAW image refers to an "original image" obtained by the image acquisition element without any data processing, that is, an image directly formed by signals of light intensity acquired by photoreceptors in the image acquisition element. Obviously, the RAW image can most comprehensively reflect the image information acquired by the image acquisition element.

(1) Background Signal Filtering

Under the condition of no ambient light, a photoreceptor in the image acquisition element can also generate a certain output signal, which is called a background signal (Sg); for example, the red component of the background signal is denoted as SgR, the green component is denoted as SgG, and the blue component is denoted as SgB.

As above, the above background signal is not an actual detection signal, and should be removed from the signal of the RAW image, i.e., the component signal of each color of the RAW image should be subtracted by the component of the corresponding color of the background signal before being used in subsequent processing.

The background signal may be obtained through testing, that is, the RAW image acquired under the condition of no ambient light at all may be output, an average of red component signals of all pixels in the RAW image is used as the above SgR, an average of green component signals of all pixels is used as the above SgG, and an average of blue component signals of all pixels is used as the above SgB.

(2) Imaging Shadow Correction

The image acquisition element refracts the external ambient light to the photoreceptors at different positions through the lens to realize imaging, and the imaging process inevitably leads to the fact that the effective clear aperture is less and less along with the increase of the included angle between the light propagation path and the optical axis of the lens, and the light reaching the photoreceptors at corresponding positions is also less and less.

Meanwhile, the surface of the photoreceptor is covered with structures such as color filters and circuits, and the less the included angle between the incident light and the target surface of the photoreceptor (i.e., "the less vertical"), the stronger the blocking effect of the structures on light.

Both of the above factors cause the signal of the pixel closer to the edge to be less in brightness relative to the actual brightness at the position, that is, the RAW image has a phenomenon of "darker closer to the edge", which is called as an imaging shadow.

In order to eliminate the effect of imaging shadow, the RAW image may be corrected by follows steps a) to e).

At step a), a surface light source with unchanged brightness is set, and the exposure time of the image acquisition element is adjusted to ensure that the exposure quantity is greater than 80% of the maximum photosensitive quantity and no overexposure exists.

At step b), the image acquisition element shoots the surface light source for i times to obtain i RAW images, and brightness signals (certainly after background signals are removed) of pixels at a same position in the RAW images are added together to obtain a superposed image, where i is at least 2 and typically may be greater than 10.

At step c), a Debayer operation is performed on the superposed image to respectively obtain brightness signals of red, green and blue channels.

At step d), the sub-pixel with the maximum brightness in each color channel is taken as a reference, and normalization processing is performed on each sub-pixel of the corresponding color to obtain a correction coefficient corresponding to each sub-pixel. For example, it may be defined that after the brightness of each sub-pixel is divided by the corresponding correction coefficient, the maximum brightness of the sub-pixel for that color is obtained. Thus, the above correction coefficients may be expressed as correction coefficient matrices CmR (for red), CmG (for green), CmB (for blue) for three color channels.

At step e), in the subsequent processing, the brightness signal of each sub-pixel (after the background signal is removed) of the acquired RAW image is divided by the corresponding correction coefficient, so as to obtain the RAW image subjected to imaging shadow correction.

(3) Exposure Time (Te) Determination

A typical brightness range of the spliced screen is determined, for example, the maximum brightness of the spliced screen used indoors may range from 500 nit to 600 nit, and is usually not more than 1000 nit.

Therefore, the brightness of a D65 standard light source may be changed within a range from 100 nit to 1000 nit by taking 100 nit as a step length; and images of the D65 standard light source are respectively shot at different exposure times under each brightness, and the exposure time when the signals of the photoreceptors for three colors each reach 80% of the maximum signal which can be detected is taken as the exposure time corresponding to the brightness.

When the image to be analyzed is acquired subsequently, the corresponding exposure time may be determined according to the actual brightness of the spliced screen.

(4) Central Area Selection

As mentioned above, due to the imaging shadow phenomenon, the light intensity actually obtained by the photoreceptor closer to the edge is less, and thus the signal-to-noise ratio of the photoreceptor closer to the edge is actually lower under the condition of certain noise existing in the environment. Therefore, in order to improve the signal-to-noise ratio, only the image closer to the central of the acquisition range (field of view range) of the image acquisition element may be selected for subsequent processing, for example, the image within an area A1 where the above correction coefficient is greater than a preset value (e.g., 0.7) may be selected for subsequent processing.

Meanwhile, the light emission of the spliced screen is usually anisotropic, and in order to avoid an excessively large included angle between the optical axis of the image acquisition element and the light emitted from the spliced screen, only the image within an area A2 with the included angle with to respect to the main optical axis being less than a preset value (e.g., 15°) may be selected for subsequent processing.

Thus, an area of intersection (A1∩A2) of the above two areas may be used as the "central area" described above, i.e., when acquiring the image to be analyzed, all pictures to be analyzed should be located in the central area of the acquisition range (field of view range), for example, the display screens as a whole are located in the central area.

(5) Acquisition Parameters of the Image to be Analyzed

When the image to be analyzed is acquired, the image acquisition element may be placed right in front of the center of the spliced screen, the optical axis of the image acquisition element is perpendicular to the display surface of the spliced screen, and the distance between the image acquisition element and the spliced screen may meet the standard that the spliced screen is located in the central area.

In order to avoid Moire in the acquired image to be analyzed to affect the processing result, the image acquisition element may be slightly out of focus, for example, the distance between the focus of the image acquisition element and the display surface of the spliced screen is greater than 0 mm and less than or equal to 1 mm.

(6) Segmentation of the Picture to be Analyzed

In order to realize the segmentation of the picture to be analyzed, the image acquisition element may be used for acquiring a RAW image including the display screen under the condition of accurate focusing, and then the Debayer (Bayer solution) operation is performed on the RAW image to obtain a conventional image (such as a Jpeg image) with brightness signals of red, green and blue channels; then, binarization processing is performed on the Jpeg image according to a preset threshold value, namely all pixels with brightness less than the threshold value are converted into pure black pixels and all pixels with brightness greater than or equal to the threshold value are converted into pure white pixels, so that the black part in the image subjected to the binarization processing is at positions corresponding to the frame, gaps and the like of the spliced screen; and after an erosion operation, the boundary of each display screen, that is, the position of the picture, to be analyzed, to be divided, can be determined.

Therefore, for the subsequent image to be analyzed, the picture to be analyzed may be segmented out from the image to be analyzed according to the position of the picture, to be analyzed, determined as above.

(7) Reference Parameter Measurement

The display screen with the minimum maximum brightness value is selected as the reference display screen, and is enabled to sequentially display a red color picture with the maximum gray scale, a green color picture with the maximum gray scale and a blue color picture with the maximum gray scale, and corresponding reference images are respectively acquired by using the image acquisition element.

Thus, parameters F11, F12, F13 are obtained according to the picture with the first color (red) and the maximum gray scale;

F21, F22, F23 are obtained according to the picture with the second color (green) and the maximum gray scale; and F31, F32, F33 are obtained according to the picture with the third color (blue) and the maximum gray scale.

(8) Acquisition of the Image to be Analyzed

All the display screens are enabled to display the white color picture with the maximum gray scale, and the image to be analyzed including all white color pictures (namely including the spliced screen) is acquired by using the image acquisition element according to the acquisition parameters.

(9) Chrominance Signal Extraction

To reduce the noise of the photoreceptor, the chrominance signal (i.e. the component of each primary color) may be extracted by combining sub-pixels, for example, an average of the signals (certainly, subjected to filtering of background signals and imaging shadow correction) of the red, green and blue sub-pixels in the range of 8×8 sub-pixels in the RAW image (the image to be analyzed) is taken as a group of output signals (R, G, B).

Furthermore, according to the obtained position for segmentation, groups of output signals corresponding to each picture to be analyzed can be determined, and the component (chromaticity) of the corresponding color in each group of output signals of each picture to be analyzed is used as the parameters f1 (corresponding to red), f2 (corresponding to green), and f3 (corresponding to blue) of the picture to be analyzed.

(10) Adjustment Coefficient Calculation

The adjustment coefficients X1 (for red), X2 (for green), X3 (for blue) for each picture to be analyzed are calculated, respectively, according to following formula (1):

$$\begin{bmatrix} f1 \\ f2 \\ f3 \end{bmatrix} = \begin{bmatrix} F11 & F21 & F31 \\ F12 & F22 & F32 \\ F13 & F23 & F33 \end{bmatrix} \begin{bmatrix} X1 \\ X2 \\ X3 \end{bmatrix}. \quad (1)$$

(10) Determination of the White Balance Adjustment Mode

The white balance adjustment mode includes: when Xi is less than a first preset value (such as 0.99), increasing the gain of the $i^{th}$ color channel of the display screen corresponding to the picture to be analyzed; when Xi is greater than a second preset value (such as 1.01), reducing the gain of the $i^{th}$ color channel of the display screen corresponding to the picture to be analyzed; and when the Xi is greater than or equal to the first preset value and less than or equal to the second preset value, keeping the gain of the $i^{th}$ color channel of the display screen, to be adjusted, corresponding to the picture to be analyzed, unchanged.

(11) Judgment

If the obtained white balance adjustment mode includes white balance adjustment on at least one display screen, after the gain of the corresponding color channel of the corresponding display screen is correspondingly changed, the step (8) of acquiring the image to be analyzed is returned to, and the steps (8) to (11) are iterated.

If the white balance adjustment mode obtained above does not include white balance adjustment for any display screen, the process of white balance adjustment is determined to be finished.

Figure 3:
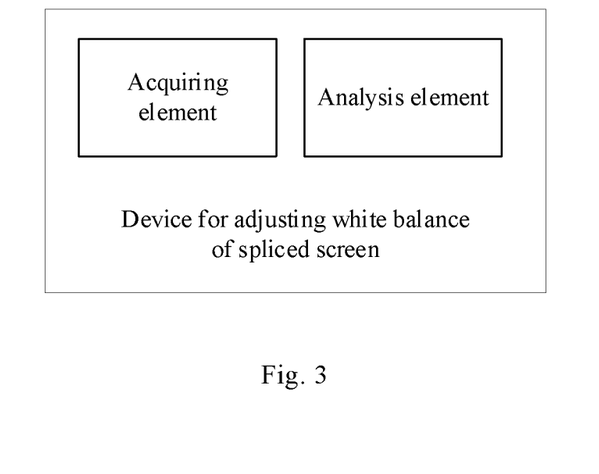
FIG. 3 is a block diagram illustrating a device for adjusting white balance of a spliced screen according to an embodiment of the present disclosure.

In a second aspect, referring to FIG. 3, an embodiment of the present disclosure provides a device for adjusting white balance of a spliced screen, including:

an acquisition element configured to acquire an image to be analyzed; the image to be analyzed includes a picture, to be analyzed, displayed by the display screen to be adjusted, and the display screen to be adjusted is at least a portion of all display screens of the spliced screen;

an analysis element configured to determine a white balance adjustment mode of the display screen, to be adjusted, corresponding to the picture to be analyzed according to at least the picture to be analyzed in the image to be analyzed.

The device for adjusting the white balance of the spliced screen according to the embodiment of the present disclosure can execute the method for adjusting the white balance of the spliced screen described above, i.e., can adjust the white balance of the spliced screen.

Figure 4:
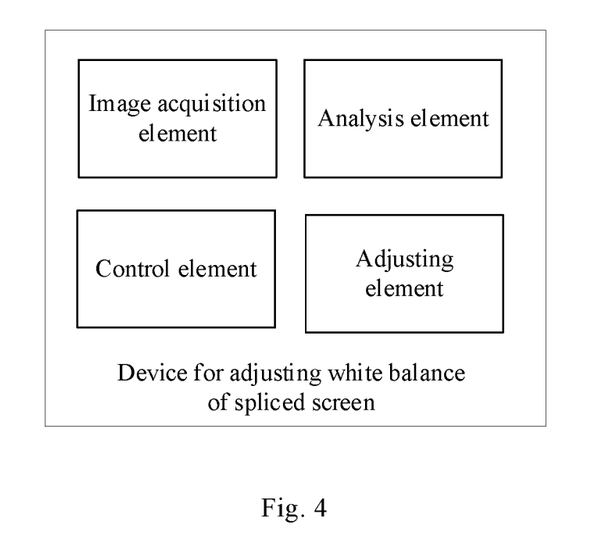
FIG. 4 is a block diagram illustrating a device for adjusting white balance of a spliced screen according to an embodiment of the present disclosure.

In some implementations, referring to FIG. 4, the acquisition element includes an image acquisition element configured to acquire the image to be analyzed.

In the embodiment of the present disclosure, the acquisition element may be an image acquisition element, so that the image acquisition element can be used for directly acquiring the image to be analyzed for subsequent processing.

The image acquisition element may be any device with an image acquisition function, such as a camera of a mobile phone, a digital camera, a video camera and the like.

Certainly, the acquisition element may take other forms. For example, the acquisition element may also be a data interface (such as a network interface, a USB interface, etc.) capable of obtaining data, so as to obtain the image to be analyzed, which has been acquired by other sources, through the data interface.

In some implementations, referring to FIG. 4, the device for adjusting white balance of a spliced screen further includes at least one of:

a control element configured to control a picture displayed by the display screen; and an adjusting element configured to perform white balance adjustment on the display screen, to be adjusted, corresponding to the white balance adjustment mode according to the white balance adjustment mode.

The device for adjusting the white balance of the spliced screen in the embodiment of the present disclosure may further include the control element and the adjusting element, where the control element can directly control each display screen to display the required picture (such as picture to be analyzed, reference picture and the like); the adjusting element can adjust the white balance of each display screen according to the obtained white balance adjusting mode.

The control element and the adjusting element may be data interfaces, such as network interfaces and serial interfaces, capable of being coupled to the spliced screen and sending control instructions to the spliced screen.

Certainly, it is also feasible if the device for adjusting the white balance of the spliced screen does not have the control element, the adjusting element, or the like. For example, the display of the display screen may be manually set and the white balance adjustment may be performed manually.

Figure 5:
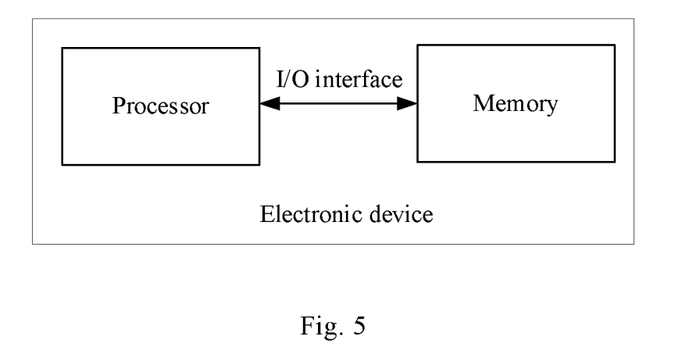
FIG. 5 is a block diagram of an electronic device according to an embodiment of the disclosure.

In a third aspect, referring to FIG. 5, an embodiment of the present disclosure provides an electronic device, including:
one or more processors;
a memory having one or more computer programs stored thereon; and
one or more I/O interfaces coupled between the processors and the memory and configured to realize information interaction between the processors and the memory;
the one or more computer programs can, when being executed by the one or more processors, implement the method for adjusting white balance of the spliced screen described above.

The processor is a device with data processing capability, which includes but is not limited to a Central Processing Unit (CPU) and the like; the memory is a device with data storage capabilities including, but not limited to, random access memory (RAM, more specifically SDRAM, DDR, etc.), Read Only Memory (ROM), Electrically Erasable Programmable Read Only Memory (EEPROM), FLASH memory (FLASH); the I/O interface (read/write interface) is coupled between the processor and the memory, and can realize information interaction between the memory and the processor, which includes but is not limited to a data Bus (Bus) and the like.

Figure 6:
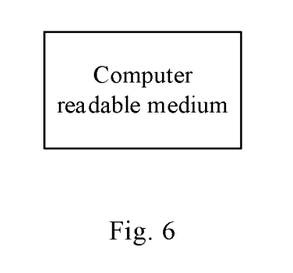
FIG. 6 is a block diagram of a computer readable medium according to an embodiment of the present disclosure.

In a fourth aspect, referring to FIG. 6, an embodiment of the present disclosure provides a computer readable medium, on which a computer program is stored, and when the computer program is executed by a processor, the method for adjusting the white balance of the spliced screen described above is implemented.

One of ordinary skill in the art will appreciate that all or some of the steps, functional modules/units in the systems, devices disclosed above may be implemented as software, firmware, hardware, and suitable combinations thereof.

In a hardware implementation, the division between functional modules/units mentioned in the above description does not necessarily correspond to the division of physical components; for example, one physical component may have multiple functions, or one function or step may be performed by several physical components in cooperation.

Some or all of the physical components may be implemented as software executed by a processor, such as a Central Processing Unit (CPU), digital signal processor, or microprocessor, or as hardware, or as an integrated circuit, such as an application specific integrated circuit. Such software may be distributed on computer readable medium, which may include computer storage medium (or non-transitory medium) and communication medium (or transitory medium). The term computer storage medium includes volatile and nonvolatile, removable and non-removable medium implemented in any method or technology for storage of information such as computer readable instructions, data structures, program modules or other data, as is well known to those skilled in the art. Computer storage medium includes, but is not limited to, random access memory (RAM, more specifically SDRAM, DDR, etc.), Read Only Memory (ROM), Electrically Erasable Programmable Read Only Memory (EEPROM), FLASH memory (FLASH), or other disk storage; compact disk read only memory (CD-ROM), Digital Versatile Disk (DVD), or other optical disk storage; magnetic cassettes, magnetic tape, magnetic disk storage or other magnetic storage; any other medium which can be used to store the desired information and which can be accessed by a computer. In addition, communication medium typically embodies computer readable instructions, data structures, program modules or other data in a modulated data signal such as a carrier wave or other transport mechanism and includes any information delivery media as is well known to those skilled in the art.

The present disclosure has disclosed example embodiments, and although specific terms are employed, they are used and should be interpreted in a generic and descriptive sense only and not for purposes of limitation. In some instances, features, characteristics and/or elements described in conjunction with a particular embodiment may be used alone or in combination with features, characteristics and/or elements described in conjunction with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

The invention claimed is:

1. A method for adjusting white balance of a spliced screen, wherein the spliced screen comprises at least two display screens, the method comprising:
acquiring an image to be analyzed; the image to be analyzed comprises a picture, to be analyzed, displayed by the display screen to be adjusted, and the display screen to be adjusted is at least a portion of all the display screens of the spliced screen; and
determining a white balance adjustment mode of the display screen, to be adjusted, corresponding to the picture to be analyzed, according to at least the picture to be analyzed in the image to be analyzed,
wherein, before the acquiring the image to be analyzed, the method further comprises:
determining one of the display screens as a reference display screen; acquiring a reference image, wherein the reference image comprises a reference picture displayed by the reference display screen; determining a reference parameter according to the reference picture in the reference image; the display screen to be adjusted is at least a portion of all the display screens of the spliced screen other than the reference display screen;
the determining the white balance adjustment mode of the display screen, to be adjusted, corresponding to the picture to be analyzed, according to at least the picture to be analyzed in the image to be analyzed comprises:
determining the white balance adjustment mode of the display screen, to be adjusted, corresponding to the picture to be analyzed, according to the picture to be analyzed in the image to be analyzed and the reference parameter,
wherein three reference images are determined, and reference pictures in the three reference images are respectively a picture with a first color and a maximum gray scale, a picture with a second color and a maximum gray scale, and a picture with a third color and a maximum gray scale; the first color, the second color and the third color constitute three primary colors and are three color channels of each display screen of the spliced screen,
the picture to be analyzed is a white picture with the maximum gray scale, the determining the reference parameter according to the reference picture in the reference image comprises: determining reference parameters F11, F12, F13, F21, F22, F23, F31, F32 and F33 according to the reference pictures in the reference images;
wherein Fij represents a color component of a $j^{th}$ color in the picture with an $i^{th}$ color and the maximum gray scale;
the determining the white balance adjustment mode of the display screen, to be adjusted, corresponding to the picture to be analyzed, according to the picture to be analyzed in the image to be analyzed and the reference parameter comprises:
determining parameters f1, f2 and f3 of any picture to be analyzed in the image to be analyze; wherein fi represents a color component of the $i^{th}$ color of the picture to be analyze;
determining adjustment coefficients X1, X2, X3 of the picture to be analyzed according to following formula (1), Xi represents a gain coefficient of an $i^{th}$ color channel:

$$\begin{bmatrix} f1 \\ f2 \\ f3 \end{bmatrix} = \begin{bmatrix} F11 & F21 & F31 \\ F12 & F22 & F32 \\ F13 & F23 & F33 \end{bmatrix} \begin{bmatrix} X1 \\ X2 \\ X3 \end{bmatrix}; \quad (1)$$

and
determining the white balance adjustment mode of the display screen, to be adjusted, corresponding to the picture to be analyzed, according to the adjustment coefficients X1, X2 and X3, the white balance adjustment mode comprises: in response to that Xi is less than a first preset value, increasing the gain of the $i^{th}$ color channel of the display screen, to be adjusted, corresponding to the picture to be analyze; in response to that Xi is greater than a second preset value, reducing the gain of the $i^{th}$ color channel of the display screen, to be adjusted, corresponding to the picture to be analyze; and in response to that the Xi is greater than or equal to the first preset value and less than or equal to the second preset value, keeping the gain of the $i^{th}$ color channel of the display screen, to be adjusted, corresponding to the picture to be analyzed, unchanged.

2. The method of claim 1, wherein after determining the white balance adjustment mode of the display screen, to be adjusted, corresponding to the picture to be analyzed, according to at least the picture to be analyzed in the image to be analyzed, the method further comprises:
in response to that the white balance adjustment mode comprises changing the gain of at least one color channel of at least one display screen to be adjusted, after the gain of the corresponding color channel of the corresponding display screen to be adjusted is correspondingly changed, returning to the acquiring the image to be analyzed; and
in response to that the white balance adjustment mode does not comprise changing the gain of any color channel of any display screen to be adjusted, ending white balance adjustment of the spliced screen.

3. The method of claim 1, wherein,
the determining the white balance adjustment mode of the display screen, to be adjusted, corresponding to the picture to be analyzed, according to at least the picture to be analyzed in the image to be analyzed comprises: segmenting the picture to be analyzed from the image to be analyzed.

4. The method of claim 1, wherein,
the picture to be analyzed is a white picture with a maximum gray scale.

5. The method of claim 1, wherein the acquiring the image to be analyzed comprises:
in response to that at least a portion of the display screens to be adjusted display the picture to be analyzed, acquiring the image to be analyzed comprising the picture to be analyzed through an image acquisition element.

6. The method of claim 5, wherein in response to that at least a portion of the display screens to be adjusted display the picture to be analyzed, the acquiring the image to be analyzed comprising the picture to be analyzed through the image acquisition element comprises:
acquiring the image to be analyzed in response to that the picture to be analyzed is displayed on at least a portion of the display screens to be adjusted, and in a preset central area in an acquisition range of the image acquisition element; the acquisition range further comprises a peripheral area surrounding the central area.

7. The method of claim 5, wherein in response to that at least a portion of the display screens to be adjusted display the picture to be analyzed, the acquiring the image to be analyzed comprising the picture to be analyzed through the image acquisition element comprises:
acquiring the image to be analyzed comprising all pictures to be analyzed at one time through the image acquisition element in response to that all the display screens to be adjusted simultaneously display pictures to be analyzed.

8. The method of claim 1, further comprising:
before acquiring the image to be analyzed, controlling a picture displayed by the display screen.

9. The method of claim 1, further comprising:
after determining the white balance adjustment mode of the display screen, to be adjusted, corresponding to the picture to be analyzed, according to at least the picture to be analyzed in the image to be analyzed, performing white balance adjustment on the display screen, to be adjusted, corresponding to the white balance adjustment mode, according to the white balance adjustment mode.

10. An electronic device, comprising:
one or more processors;
a memory having one or more computer programs stored thereon; and
one or more I/O interfaces coupled between the processors and the memory and configured to realize information interaction between the processors and the memory; the one or more computer programs implement, when being executed by the one or more processors, the method for adjusting white balance of the spliced screen of claim 1.

11. A non-transitory computer readable medium, on which a computer program is stored, the computer program implements, when being executed by a processor, the method for adjusting white balance of the spliced screen of claim 1.

12. The method of claim 1, wherein the determining one of the display screens as the reference display screen comprises:
determining the display screen with a minimum brightness for displaying a white picture with a maximum gray scale, in all the display screens of the spliced screen, as the reference display screen.

* * * * *